(12) United States Patent  (10) Patent No.: US 7,605,844 B1
Page et al.  (45) Date of Patent: Oct. 20, 2009

(54) IMAGING OPPOSING BOUND PAGES AT HIGH SPEED USING MULTIPLE CAMERAS

(75) Inventors: Lawrence Page, Palo Alto, CA (US); Christopher Richard Uhlik, Danville, CA (US)

(73) Assignee: Google Inc., Mountain View, CA (US)

( * ) Notice: Subject to any disclaimer, the term of this patent is extended or adjusted under 35 U.S.C. 154(b) by 619 days.

(21) Appl. No.: 10/713,662

(22) Filed: Nov. 13, 2003

(51) Int. Cl.
H04N 5/225 (2006.01)
H04N 5/76 (2006.01)
G03B 27/52 (2006.01)
H04N 1/04 (2006.01)

(52) U.S. Cl. ............... 348/207.99; 348/231.8; 355/25; 358/482

(58) Field of Classification Search ........ 355/25; 358/474, 482; 348/231.8
See application file for complete search history.

(56) References Cited

U.S. PATENT DOCUMENTS

| | | | |
|---|---|---|---|
| 2,406,152 A * | 8/1946 | Levine | 352/25 |
| 4,356,390 A | 10/1982 | Feilchenfeld | |
| 5,185,821 A | 2/1993 | Yoda | |
| 5,636,006 A * | 6/1997 | Wu | 355/75 |
| 5,640,252 A * | 6/1997 | Turner et al. | 358/497 |
| 5,777,660 A * | 7/1998 | Ard | 347/260 |
| 5,835,241 A | 11/1998 | Saund | |
| 5,886,342 A | 3/1999 | Matsui | |
| 6,124,950 A | 9/2000 | Honda | |
| 6,491,278 B1 * | 12/2002 | Thomsen | 248/460 |
| 6,493,469 B1 * | 12/2002 | Taylor et al. | 382/284 |
| 6,762,862 B2 * | 7/2004 | Lam et al. | 358/482 |
| 7,113,619 B1 | 9/2006 | Matama | |
| 7,224,472 B2 | 5/2007 | Bauch et al. | |
| 2003/0086721 A1 | 5/2003 | Guillemin et al. | |
| 2004/0047009 A1 | 3/2004 | Taylor et al. | |

OTHER PUBLICATIONS

Transaction History from PAIR printed Apr. 7, 2009, for U.S. Appl. No. 10/611,681.
Transaction History from PAIR printed Apr. 7, 2009, for U.S. Appl. No. 10/611,666.
Transaction History from PAIR printed Apr. 7, 2009, for U.S. Appl. No. 10/611,408.

* cited by examiner

*Primary Examiner*—David L Ometz
*Assistant Examiner*—Dillon Durnford-Geszvain
(74) *Attorney, Agent, or Firm*—Fish & Richardson P.C.

(57) ABSTRACT

Systems and methods for capturing images of opposing pages in a bound document at high speed using multiple cameras are disclosed. The system generally includes a cradle preferably tilted toward an operator for holding a bound document having two opposing sides, and two cameras each positioned to capture an image of a corresponding side, each camera having an image capture size approximately the size of each side. The cameras may be high definition and store images via direct high speed data communication interfaces, e.g., firewire. A controller and/or foot pedal may provide control of the cameras. The controller may control flashes to selectively light each side simultaneous with each camera capturing the image of the corresponding side. A positioner may position a light-absorbing page between opposing sides.

20 Claims, 4 Drawing Sheets

IMAGING OPPOSING BOUND PAGES AT HIGH SPEED USING MULTIPLE CAMERAS

CROSS REFERENCE TO RELATED APPLICATIONS

This application is related to co-pending U.S. patent application Ser. No. 10/611,408 entitled "Movable Document Cradle For Facilitating Imaging of Bound Documents", U.S. patent application Ser. No. 10/611,681 entitled "Pacing And Error Monitoring Of Manual Page Turning Operator", and U.S. patent application Ser. No. 10/611,666 entitled "Acquiring And Using Three-Dimensional Information in a Document Scanning System", filed on Jun. 30, 2003, which are incorporated herein by reference in their entireties.

BACKGROUND OF THE INVENTION

1. Field of the Invention

The present invention relates generally to scanning bound documents. More specifically, systems and methods for capturing images of opposing pages in a bound document at high speed using multiple cameras are disclosed.

2. Description of Related Art

Scanning books, magazines, and other printed material into digital form has become more common with the advent of improved imaging, storage and distribution techniques. Although unbound printed material can generally be scanned with relative ease using automatic page-feeding mechanisms such as those commonly found on digital copiers and scanners, bound documents present additional challenges. Bound documents include not only books, but also periodicals, manuscripts, pamphlets, brochures, newspapers, manuals, and any other document having a bound edge. Many institutions, such as the Library of Congress, universities, bookstores, and private enterprises have vast collections of bound documents. By converting these documents into electronic form, such institutions can reduce the cost of storage, facilitate remote access, enable simultaneous access by multiple users, facilitate search and retrieval of information, and/or protect information in rare or out-of-print works from loss or destruction.

Once the content of a bound document is scanned, the recorded image can be manipulated or otherwise processed. Digitally recorded bound documents can be reformatted, supplemented with additional information, compressed, and/or processed with OCR (optical character recognition) software, and indexed to facilitate electronic search. Thus, scanning and recording of bound documents facilitates the creation of digital libraries that can be remotely and simultaneously accessed and searched by multiple users.

Various mechanisms have been developed to enable the scanning of bound documents. For example, a traditional flat-bed platen scanner scans bound documents in a face-down position. However, for best results, a flat-bed scanner typically requires the application of force to the spine or binding region of the bound documents to insure that they come within the scanner's depth of focus. Such force can damage the spine region of the document. In addition, using the flat-bed platen can be tedious and time-consuming, as the bound documents typically must be lifted and repositioned after each page is scanned. Further, image quality is often poor due to loss of focus, uneven illumination, and distortion caused by page curvature in the vicinity of the binding.

An alternative to the traditional flat-bed platen scanner is a platen-less scanner that captures image data from a bound document in a face-up position. Such scanners typically do not require application of additional stress to the binding region of a bound document, since the document is scanned in its natural, face-up position. Some such scanners make use of automatic page turning apparatuses. In addition, optics and software have been developed for compensating for the image-distortion resulting from the inherently curved surfaces typical of open, edge-bound books that are not subjected to potentially damaging flattening pressure. For example, the curvature of a document's pages may be detected using a curvature detector, with a linear light source for defining a brightness distribution. The detected curves of the page can then be used to approximately rectify image signals received from the document scanner.

The scanning of bound documents can still be further improved. It would be desirable to provide a system and method for imaging pages of a bound document at high resolution easily, efficiently and cost effectively. Ideally, such a high resolution imaging system and method would capture the image and download the digital data at a speed that is at least comparable to the speed at which a person or a robot can comfortably turn the pages.

SUMMARY OF THE INVENTION

Systems and methods for capturing images of opposing pages in a bound document at high speed using multiple cameras are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The system generally includes a cradle preferably tilted toward an operator for holding a bound document having two opposing sides, and a first and second camera positioned to capture an image of the first and second sides, respectively, each camera having an image capture size approximately the size of each side and each camera configured to store the captured images. The cameras may be high definition and store images to memory via direct high speed data communication interfaces. Although not preferred, the cameras may store images to flash memory cards that may be swapped when their memory capacity is reached. A controller and/or foot pedal may provide control of the cameras. The controller may also control flashes to selectively light each side simultaneous with each camera capturing the image of the corresponding opposing side. A positioner may position a light-absorbing page between the opposing sides.

A process for imaging a bound document generally includes the steps of positioning an open bound document on a cradle, the bound document having two opposing sides generally facing away from the cradle, capturing an image of a first opposing side of the bound document with a first camera, the first camera having an image capture size approximately the size of the first opposing side, the first camera being configured to store the captured image of the first opposing side, and capturing an image of a second opposing side of the bound document with a second camera, the second camera having an image capture size approximately the size of the second opposing side, the second camera being configured to store the captured image of the second opposing side.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods for capturing images of opposing pages in a bound document at high speed using multiple cameras are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
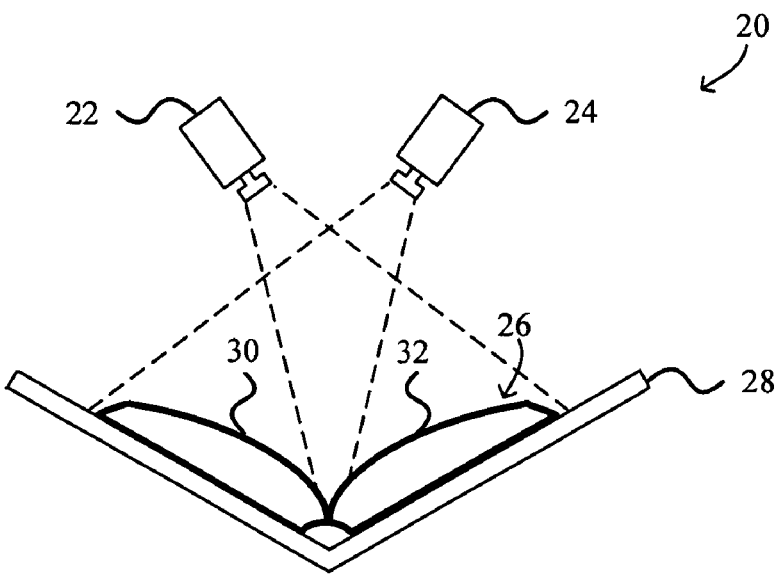
FIG. 1 is a schematic diagram of one exemplary embodiment of a high speed, high resolution image capturing system.

FIG. 1 is a schematic diagram of one exemplary embodiment of a high speed, high resolution image capturing system 20. The image capturing system 20 generally includes two high definition cameras 22, 24, each positioned to image or photograph a corresponding facing page of an open bound document, such as a book 26 resting in a support such as a cradle 28. It is to be understood that although a book is used herein in describing the imaging system and process, the system and process may be utilized to and/or adapted to image any other suitable types of bound documents such as periodicals, manuscripts, pamphlets, brochures, newspapers, manuals and/or any other types of documents having a bound edge, typically with a hard or soft cover. The cameras 22, 24 are preferably high resolution cameras. In general, a minimum resolution of 200 dpi is preferred, 300 dpi resolution being more preferable. However, although high resolution or high definition cameras 22, 24 are preferred, camera of lower or even higher resolutions may be utilized.

As noted, each high definition camera 22, 24 is positioned to image the corresponding facing page of the book 26. For example, high definition camera 24 is positioned to image the left facing page 28 while high definition camera 22 is positioned to image the right facing page 30, as shown in FIG. 1.

Each camera is preferably set up to overscan, e.g., approximately 0.5 inches, at all four edges of the page. In other words, each camera has an image capture size approximately the size of each opposing side.

As is evident, using a separate camera for each of the two facing pages 30, 32, doubles the resolution of the image and halves the time for image capture and image data download. The two-camera image capturing system is also simplified as the system does not require moving mirrors in order to capture both of the facing pages using a single camera.

Figure 2:
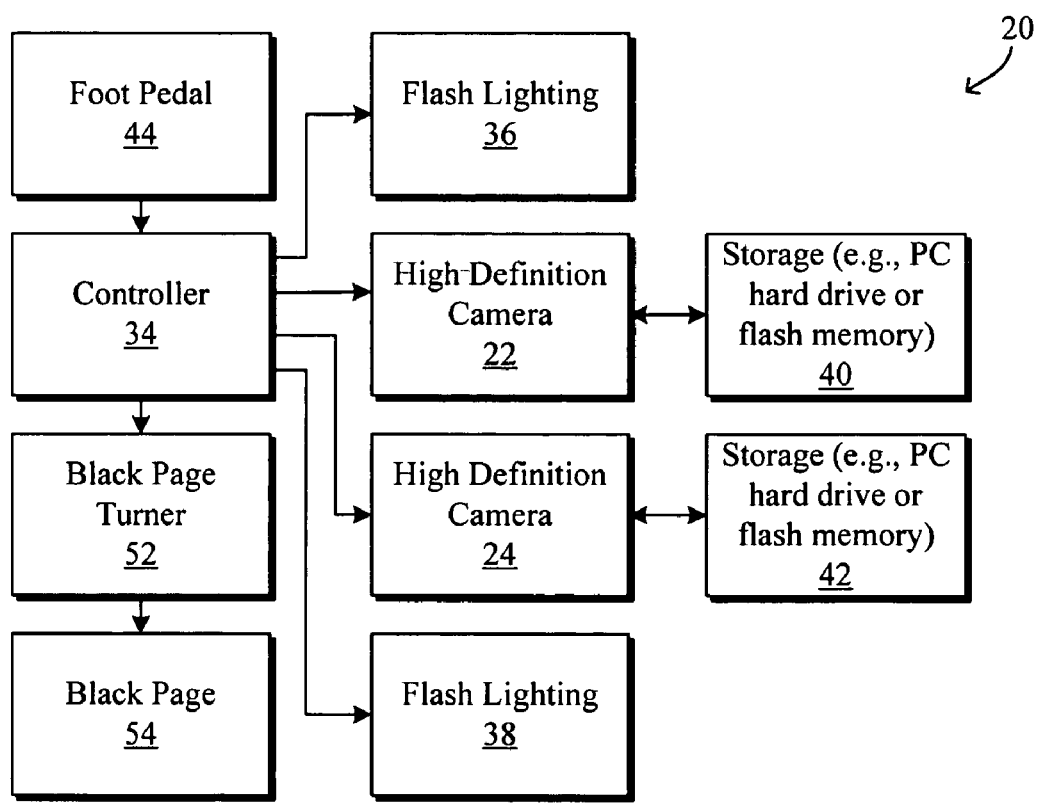
FIG. 2 is a block diagram illustrating additional elements of the high speed, high resolution image capturing system of FIG. 1.

FIG. 2 is a block diagram illustrating additional elements of the high speed, high resolution image capturing system 20 of FIG. 1. As shown, the image capturing system 20 optionally includes a controller 34 that controls flash lighting 36, 38 corresponding to each high definition camera 26, 28. Each flash lighting 36, 38 may be directed to the corresponding facing page of the open bound document with little or no light being directed to the opposing facing page such that light reflection off of the opposing facing page is avoided or otherwise reduced.

In one preferred embodiment, the controller controls the flash lighting 36, 38 and the high definition cameras 26, 28 such that they operate sequentially. In particular, the controller causes (i) the flash lighting 36 to flash light onto the left facing page, (ii) the high definition camera 26 to image the left facing page, (iii) the flash lighting 38 to flash light onto the right facing page, and (iv) the high definition camera 28 to image the right facing page in a sequential manner. It is noted that although flash lighting is described herein, any other suitable mechanism for lighting the facing pages of the book may be employed. For example, constant high-intensity lighting may be provided and preferably arranged to limit glare and provide comfort to a manual page turning operator.

After capturing the images, the high definition cameras 26, 28 may store the digital image data to any suitable memory device. A single storage device may be shared between the cameras 26, 28 or multiple storage devices 40, 42, each dedicated to a corresponding camera, may be employed. In addition, one or more computer systems or one or more processors may be employed to facilitate storage of digital image data to memory. In a preferred embodiment, digital image data from the cameras 26, 28 can be stored to the memory device, e.g., hard drive or other storage on a personal computer, via direct high speed data communication interfaces, e.g., firewire, between the cameras and the memory device. Any other storage and/or communication links (using USB or Ethernet, for example) may be employed provided that the storage and/or communication links have a sufficiently fast download speed in comparison to the amount of time required to capture the images. Preferably, the data download rate supports a speed of image download in approximately 1 or 2 seconds.

Although not preferred, the image capturing system 20 may store images to a pair of flash memory cards 40, 42 corresponding to the two high definition cameras 26, 28, respectively. When memory capacity is reached, for example, the first pair of flash memory cards may be swapped for another pair of flash memory cards while the images stored on the first pair of cards are being downloaded.

The controller 34 may also control various other elements of the image capturing system 20. For example, controller 34 may control an electromechanical page turning device and/or various other devices (not shown).

The high speed, high resolution image capturing system 20 may also provide a foot pedal so that an operator may depress the foot pedal to activate one or more functions. For example, the pages of the book may be manually turned by an operator such that the operator may depress the foot pedal after turning a page to cause the controller 34 to initiate the sequence of flashing light and/or imaging actions, e.g., light flash and image capture of the left and right facing pages, as described above. Alternatively, an electromechanical page turner may be provided such that when the operator depresses the foot pedal, the controller causes the sequence of flashing light and/or imaging actions, as described above, and then causes the page turner to turn a page. The operator may then confirm that there are no faults or exceptions before depressing the foot pedal again. As another alternative, an electromechanical page turner may be manually operated by an operator such that the operator may depress the foot pedal to cause a page to be turned and then depress the foot pedal again to cause the controller to initiate the sequence of flashing light and/or imaging actions.

Figure 3:
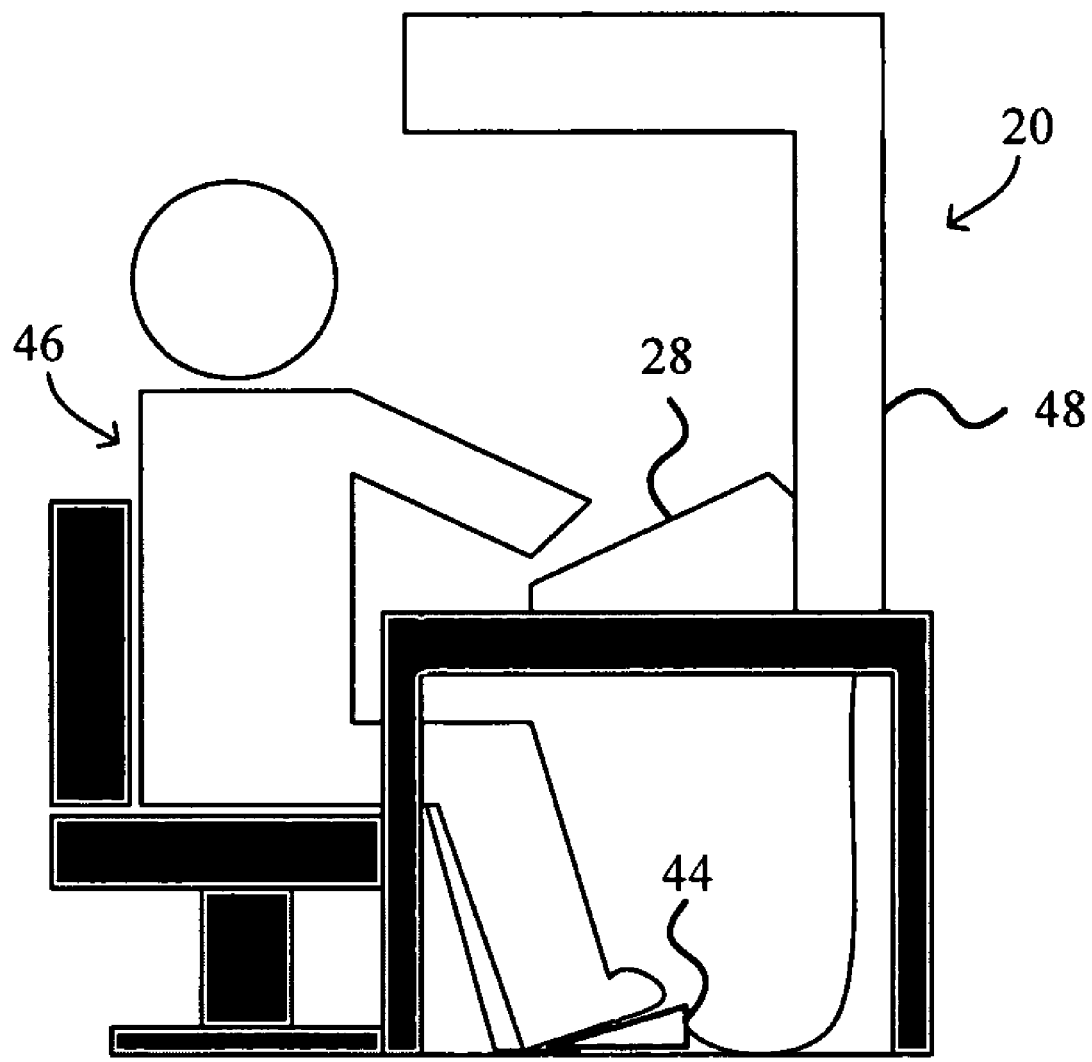
FIG. 3 is a schematic diagram illustrating additional elements of the high speed, high resolution image capturing system of FIG. 1.

FIG. 3 is a schematic diagram illustrating an operator 46 at the high speed, high resolution image capturing system 20. As shown, the operator 46 may operate the foot pedal 44 with his foot. The system 20 may include a housing 48 to house the high definition cameras and various lighting mechanisms. The cradle 28 is preferably tilted toward the operator 46 to provide comfort to the operator 46. The angle of the tilt, e.g., 10°, is preferably adjustable and may be dependent upon various human factors such as the height of the operator, the chair and/or the table as well as the shape and condition of the book (e.g., glossy pages, etc.) and/or any other parameters.

Referring again to FIG. 2, the high speed, high resolution image capturing system 20 may optionally include a black page or other light-absorbing page and a black page turner 44 for turning the black page onto the facing page opposing the page being imaged. The black page facilitates in absorbing light impinging upon the facing page opposite the page being imaged and thus reduces the amount of glare reflected from the opposing page that would otherwise interfere with the imaging of the page being imaged. Preferably, the black page turner 44 is automatically controlled by the controller 34. In particular, the black page turner 44 positions the black page over the right facing page when the left facing page is being imaged. The black page turner 44 then removes the black page from the right facing page and positions the black page over the left facing page so that the right facing page can then be imaged. The left and right facing pages may share the same black page or may each have its own corresponding black page.

Figure 4:
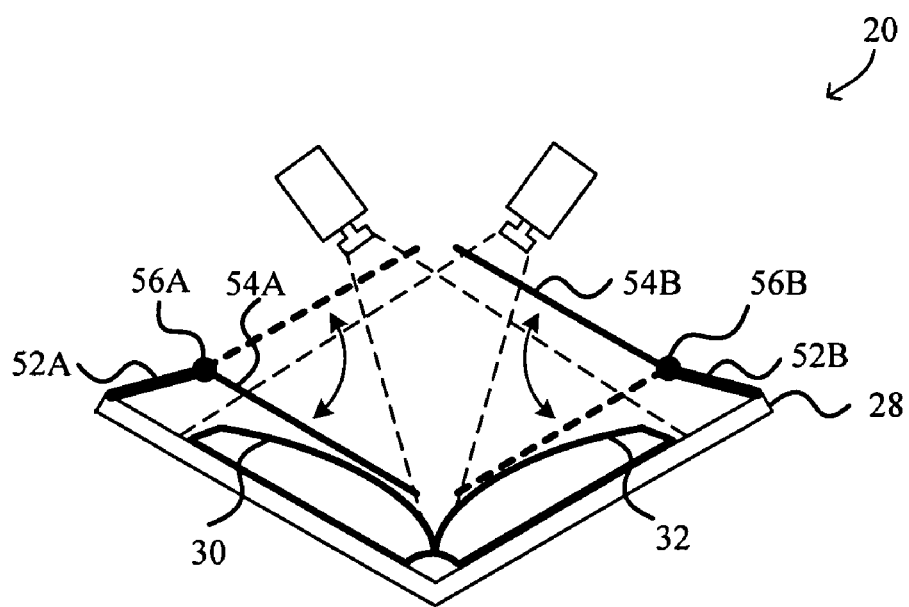
FIG. 4 is a schematic diagram of an alternative embodiment of a high speed, high resolution image capturing system.
Figure 5:
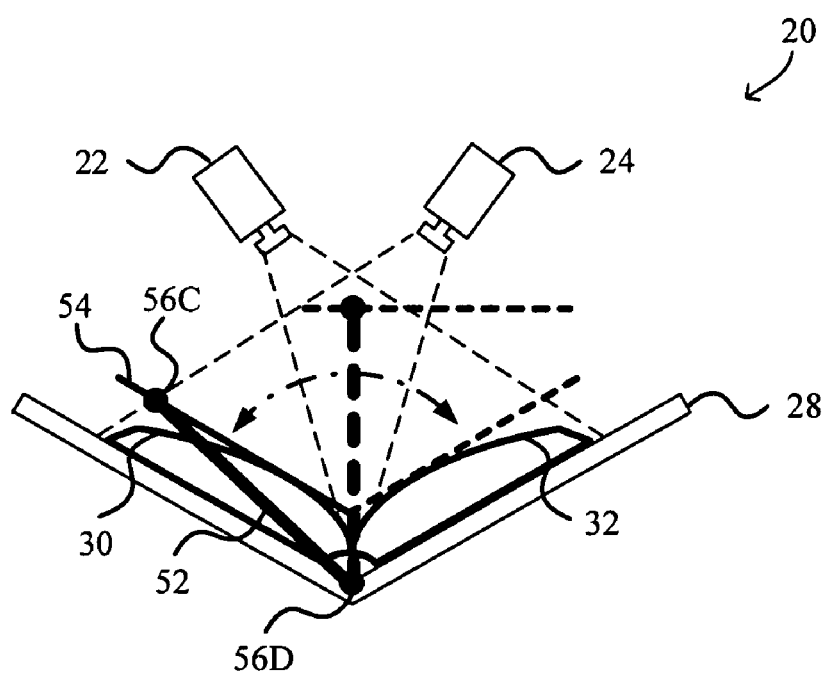
FIG. 5 is a schematic diagram of another alternative embodiment of a high speed, high resolution image capturing system.

FIGS. 4 and 5 are schematic diagrams of the high speed, high resolution image capturing system 20 with alternative embodiments of the black page(s) and the black page turner(s). In particular, the image capturing system 20 shown in FIG. 4 includes a black page 54A and a black page turner 52A for the left facing page 30 as well as a black page 54B and a black page turner 52B for the right facing page 32. The black pages 54A, 54B may be moved into alternate positions. In one position, as shown in solid lines, the left black page 54A is positioned over the left facing page 30 and the right black page 54B is lifted off of the right facing page 32 to allow the right facing page 32 to be imaged without or with reduced glare reflected off of the left facing page 30. In an alternate position, as shown in dashed lines, the right black page 54B is positioned over the right facing page 32 and the left black page 54A is lifted off of the left facing page 30 to allow the left facing page 30 to be imaged without or with reduced glare reflected off of the right facing page 32. When the black page 54 is lifted off of the corresponding facing page, the black page 54 is preferably lifted sufficiently high above the corresponding facing page so as to not interfere with the camera's imaging of the opposing page.

The black pages 54A, 54B may be moved into each of the alternate positions by rotating about a pivot 56A, 56B of the black page turner 52A, 52B, respectively. Alternatively or additionally, the black page 54A, 54B may be moved into alternate positions by allowing rotation of the black page turner 52A, 52B about pivots where the cradle 28 (or other fixed point of the image capturing system 20) and the black page turners 52A, 52B meet.

FIG. 5 is a schematic diagram of the high speed, high resolution image capturing system 20 with an alternative embodiment of the black page 54 and the black page turner 52. In particular, the image capturing system 20 shown in FIG. 5 includes a single black page 54 and a single black page turner 52 for both the left and right facing pages 30, 32. The black pages 54 may be moved into alternate positions. In one position, as shown in solid line, the black page 54 is positioned over the left facing page 30 to allow the right facing page 32 to be imaged without or with reduced glare reflected off of the left facing page 30. In an alternate position, as shown in dashed line, the black page 54 is positioned over the right facing page 32 to allow the left facing page 30 to be imaged without or with reduced glare reflected off of the right facing page 32. The black page 54 may also be lifted sufficiently high off of both of the facing pages 30, 32, also shown in dashed, to allow page turning of the book. The black page 54 may be moved into each of the alternate positions by rotating the black page 54 about a pivot 56C and/or a pivot 56D of the black page turner 52.

In each of the alternative embodiments of the black page and black page turner shown in FIGS. 4 and 5, the black page is preferably made of a cardboard stock or other material so that the black page maintains its relatively flat shape such that the black page does not interfere with the image capturing by each camera when appropriately positioned. It is noted that while alternative configurations of the black page turner mechanism are shown and described herein, any other suitable black page turning mechanism may be employed. In addition, the black page turning mechanism is typically employed when constant high-intensity lighting, rather than directed flash lighting, is utilized.

Figure 6:
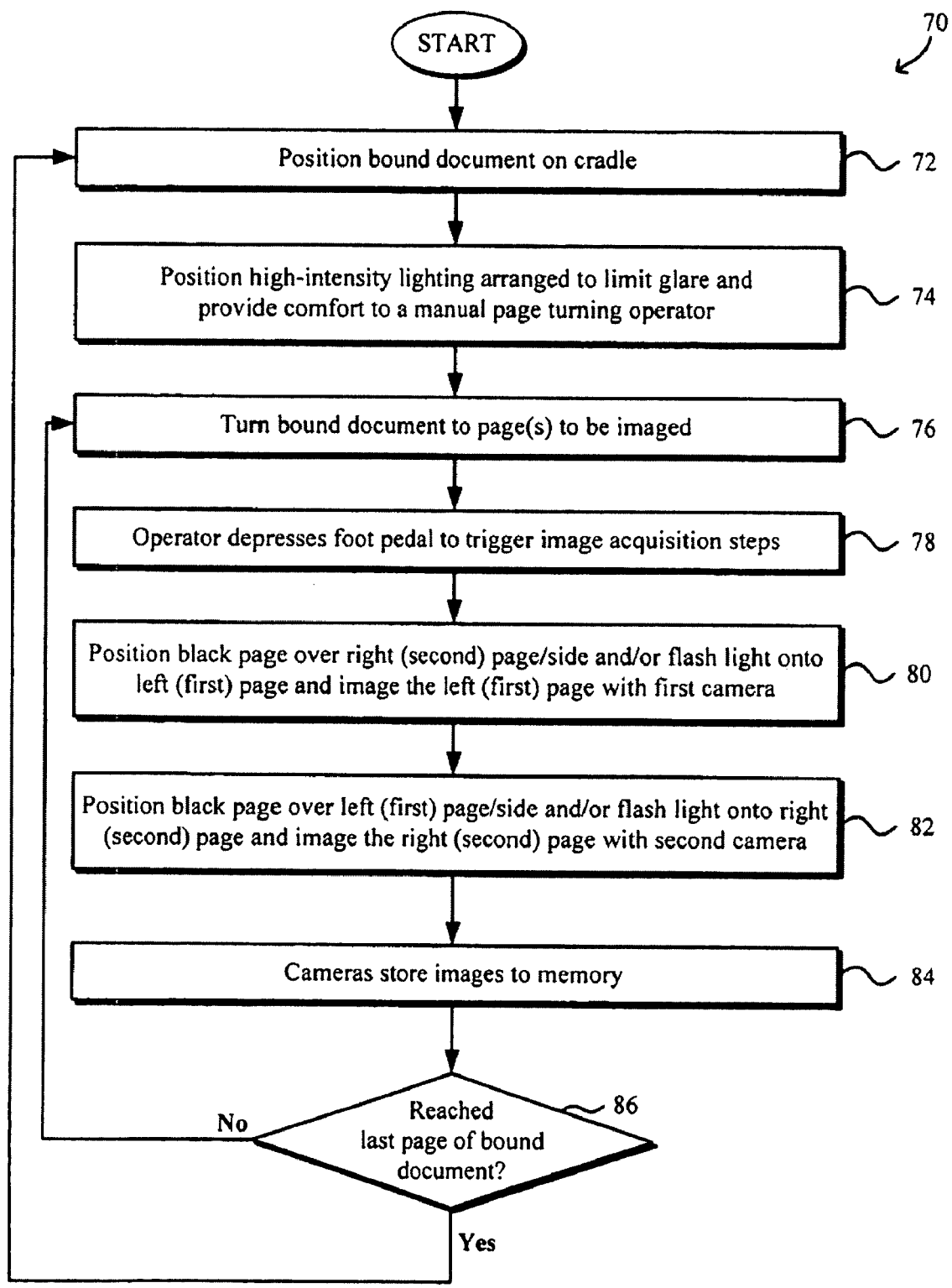
FIG. 6 is a flowchart illustrating a process for capturing images of the pages in a bound document at high resolution and high speed.

FIG. 6 is a flowchart illustrating an exemplary process 70 for capturing images of the pages in a bound document at high resolution and high speed. At step 72, a bound document is positioned on a cradle. At step 74, lighting, preferably high-intensity lighting, is optionally positioned to cast light on the facing pages of the bound document while limiting glare and providing comfort to a manual page turning operator, if any. Alternatively or additionally, flash lighting may be used to properly light the facing pages to be imaged.

At step 76, the bound document is turned to the facing pages to be imaged. This step may be performed, for example, by a manual page turning operator, by an automatic page turning device, or by a page turning device operable by an operator. At step 78, the operator may depress a foot pedal to trigger image acquisition steps as controlled by a controller of the system. At step 80, a black page may be placed over the right or second page or side of the two facing pages or sides of the open bound document. Alternatively or additionally, a flash directed at the left or first page may be triggered. At the same time, an image of the left or first page is captured with a first camera, preferably a high definition camera. Similarly, at step 82, a black page may be placed over the left or first page of the facing pages of the open bound document. Alternatively or additionally, a flash directed at the right or second page may be triggered. At the same time, an image of the right or second page is captured with a second camera, preferably a high definition camera.

At step 84, the cameras store images to memory, preferably hard drive or other storage on a personal computer, via direct high speed data communication interfaces, e.g., firewire. At step 86, if the last page has not been reached, the process returns to step 76 in which the bound document is turned to a new set of facing pages to be imaged. Alternatively, if the last page has been reached, the process returns to step 72 in which a new bound document is positioned on the cradle. Although not preferred, if cameras store images to flash cards associated with each camera, once the memory capacity or the end of the book has been reached, the flash memory cards (or other similar memory devices) may be swapped with another set of flash cards.

It is to be understood that using two cameras is the preferred embodiment. However, the image capturing system may include more than two cameras such as an array of synchronized cameras. The array of synchronized cameras preferably includes an even number of cameras so that each side is imaged the same number of cameras. In such a system, the bound document is preferably constrained with a overlaid platen or glass plate so as to constrain the facing pages of the book to a single plane to facilitate joining the multiple images of each facing page into one image. Providing more than two cameras enables capturing of images at a higher resolution than would be feasible with only two cameras.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. An imaging system for imaging a bound document, comprising:
    a first camera positioned to capture an image of a first side of the bound document;
    a second camera positioned to capture an image of a second side of the bound document; and
    at least one page that is independent of the bound document, and that selectively covers one of the first side and the second side of the bound document, wherein the first camera images the first side of the bound document while the first side is not covered by the at least one page and the second side is covered by the at least one page, and the second camera subsequently images the second side of the bound document while the second side is not covered by the at least one page and the first side is covered by the at least one page, the first camera imaging the first side and the second camera imaging the second side prior to turning a page of the bound document, which page includes the second side.

2. The imaging system of claim 1, further comprising a support for holding the bound document thereon, the first and second sides of the bound document facing away from the support.

3. The imaging system of claim 1, further comprising a separate high speed data interface for directly transmitting captured images from each of the first and second cameras to a memory device.

4. The imaging system of claim 1, further comprising a first and second flash memory cards, the first and second cameras being configured to store captured images to the first and second flash memory cards, respectively.

5. The imaging system of claim 1, further comprising:
    a first flash associated with the first camera for selectively lighting the first side simultaneously with the first camera capturing the image of the first side; and
    a second flash associated with the second camera for selectively lighting the second side simultaneously with the second camera subsequently capturing the image of the second side.

6. The imaging system of claim 1, further comprising a positioner for positioning the at least one page, the positioner having a first position for positioning the at least one page over the first side, and a second position for positioning the at least one page over the second side.

7. The imaging system of claim 1, further comprising a support that holds the bound document open, such that a center axis of the open bound document is tilted at an angle toward an operator.

8. The imaging system of claim 1, wherein the first and second cameras are high definition cameras.

9. The imaging system of claim 1, further comprising a first pair of flash memory cards for storing images, and a second pair of flash memory cards for swapping with the first pair of flash memory cards.

10. A process for imaging a bound document, comprising:
    covering a second side of a bound document with at least one page that is independent of the bound document;
    capturing an image of a first side of the bound document using a first camera while the first side is not covered by the at least one page and the second side is covered by the at least one page;
    covering the first side of a bound document with the at least one page; and
    subsequently capturing an image of a second side of the bound document using a second camera while the second side is not covered by the at least one page and the first side is covered by the at least one page, the first camera imaging the first side and the second camera imaging the second side prior to turning a page of the bound document, which page includes the second side.

11. The process of claim 10, further comprising supporting the bound document on a support with the first and second sides facing away from the support.

12. The process of claim 10, further comprising storing images of the first and second sides captured by the first and second cameras, respectively, to a memory device via a respective first and second high speed data interface.

13. The process of claim 10, further comprising storing images of the first and second sides captured by the first and second cameras, respectively, to a respective first and second flash memory card.

14. The process of claim 10, further comprising controlling capturing the images using a controller.

15. The process of claim 10, further comprising:
    flashing light onto the first side simultaneously with the first camera capturing the image of the first side; and
    flashing light onto the second side simultaneously with the second camera subsequently capturing the image of the second side.

16. The process of claim 10, further comprising providing a positioner for positioning the at least one page at a first position to cover the first side, and at a second position to cover the second side.

17. The process of claim 10, further comprising supporting the bound document to be open, such that a center axis of the open bound document is tilted at an angle toward an operator.

18. The process of claim 10, wherein the first and second cameras are high definition cameras.

19. The process of claim 10, further comprising controlling image capturing by the first and second cameras using a foot pedal.

20. The process of claim 10, further comprising:
    storing images onto a first pair of flash memory cards; and
    swapping the first pair of flash memory cards with a second pair of flash memory cards.

* * * * *

UNITED STATES PATENT AND TRADEMARK OFFICE
CERTIFICATE OF CORRECTION

| | |
|---|---|
| PATENT NO. | : 7,605,844 B1 |
| APPLICATION NO. | : 10/713662 |
| DATED | : October 20, 2009 |
| INVENTOR(S) | : Page et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1183 days.

Signed and Sealed this

Twenty-first Day of December, 2010

David J. Kappos
*Director of the United States Patent and Trademark Office*